Patented Feb. 27, 1923.

1,447,123

UNITED STATES PATENT OFFICE.

LUIGI CASALE, OF ROME, ITALY, ASSIGNOR TO CASALE AMMONIA COMPANY, OF LUGANO, SWITZERLAND.

SELF-REGULATING AMMONIA-MAKING PROCESS.

No Drawing.     Application filed August 15, 1922. Serial No. 582,075.

*To all whom it may concern:*

Be it known that I, LUIGI CASALE, a subject of the King of Italy, and residing at Rome, Italy, have invented a new and Improved Self-Regulating Ammonia-Making Process, of which the following specification is a full disclosure.

The herein-disclosed invention deals with the synthesis of ammonia through the instrumentality of catalytic agents and, by virtue of its peculiar improvement, this invention exercises an industrially important self-control over the catalyzing operation.

This is a continuation in part of the co-pending application filed by me in the United States Patent Office on November 16, 1921, se ial numbered 515,640; the present application aiming to enlarge upon and to present more analytically certain theoretical aspects of the process outlined in the aforesaid co-pending application and to indicate more clearly certain adaptations and exemplifications of the same.

This invention is predicated upon the discovery that, when a highly compressed gaseous mixture of hydrogen and nitrogen (in the combining proportions) plus a sufficient quantity of pre-formed ammonia, is caused to flow in intimate contact with an energetic catalyst at a temperature compatible with the normal effectivity of the catalyst, the predetermined initially added ammonia will beneficially act as an automatic regulator in a plural way, to wit, (A) by causing the reaction to be promoted by the catalyst in a more moderate manner than if ceteris paribus hydrogen and nitrogen alone were present and, by thus limiting the rate of formation of the ammonia; thereby preventing the generation of heat at an unduly vigorous rate, (B) by acting as a thermal balance in absorbing and carrying away an appreciable portion of the heat generated instead of being a source of undesirable heat as it would be if generated from pure gases within the catalytic chamber; thereby contributing towards the avoidance of such accumulation of heat as would otherwise tend to permit the temperature to increase to the point of impairing the catalyst and, (C) especially by disproportionally fixing the amounts of ammonia capable of being created within the progressively lowered equilibrium limits determined by successively greater temperatures; thereby rendering it disproportionally difficult for the highly active particles of the catalyst to function whenever the reaction tends either locally or generally to proceed so vigorously as to develop a temperature injurious to the catalyzing material.

The invention, while exceedingly simple in a practical or commercial sense, is founded upon certain principles inter-related in a more or less involved manner and, accordingly in order to attain a clear grasp of the theory of operation of this conception, it is essential that certain fundamental facts should be kept clearly in mind and considered in their mutual relations.

In a chemical reaction of the nature here involved, the reaction never proceeds directly to an extent so complete as to utilize absolutely all of the combinable ingredients. This is a reaction of the type known to chemists as a reversible or equilibrium reaction. There is always present, in greater or lesser amounts, depending upon conditions of temperature and pressure, a certain equilibrium quantity of the initial ingredients in an uncombined state.

It appears, therefore, that the limit which the reaction can ultimately attain is governed mutually by two physical factors, to wit, the pressure and the temperature. The presence of more or less of the ultimate product does not shift this limit but merely qualifies the extent to which the reaction may proceed before the limit is reached. The higher the pressure (the temperature being kept constant) the more ammonia can be produced, i. e., the equilibrium will be satisfied only by the presence of higher percentages of ammonia as the pressure increases. On the other hand, as the temperature is increased (the pressure being kept constant) the successive conditions of equilibrium call for progressively diminished percentages of ammonia. This rule governs dis-association as well as association of elements.

For example, if hydrogen and nitrogen (in combining proportions) be caused to react at a temperature of 500 degrees C. and under a pressure of 700 atmospheres, the peak or end of the reaction will be reached when it has proceeded to an extent of about 37% of ammonia; this being the equilibrium figure determined by those conditions. Likewise, if the temperature be 750 degrees C. and the pressure be 700 atmospheres, the peak of the reaction (by which is meant its limit) will not exceed 9% of ammonia.

We thus see how the extent of the reaction is fixed by certain conditions. This may be regarded as the distance the reaction may go; it being longer or shorter, depending upon the remoteness of the ultimate goal and upon the length already passed over and represented by the quantity of the ultimate product present at any given time. This distance is represented in percentage relation to the elements entering into the reaction; foreign elements, such as neutral or inert gases, not entering into consideration and being regarded as mere dilutants.

There is another factor, the special significance of which will appear subsequently. This is the rate of formation; in other words, the speed or rate at which the reaction progresses. This is not a constant but is a variable. For each given temperature, the reaction gradually slows down as it travels from station to station towards its ultimate goal; the limit being rigidly fixed by the equilibrium figure. If we start the reaction at an intermediate station (by initially supplying as much of the ultimate product as reaches that station) it will go more slowly than if it was started at any previous station. And when the reaction has nearly attained its goal, it goes slowly and laboriously. It dies down as it goes along, so to speak; its greatest vigor being manifested at the very start. So also, if it be started at zero with the object of attaining a remote equilibrium figure, it will start more rapidly than if the equilibrium figure were less remote.

So long as we are working at points remote from the conditions of equilibrium, an increase in temperature increases the rate of formation. For example, at freezing temperature, the rate of ammonia formation will be exceedingly slow notwithstanding the fact that the gasses containing no ammonia are very far from the equilibrium figure. At 400° C., as an example, although the equilibrium figure is much nearer, the rate of formation will be higher. At exceedingly high temperatures, the nearness of the point of equilibrium, even when working with gases containing no ammonia, will again reduce the rate of formation; such high temperatures being never resorted to commercially due to the deleterious effect on the apparatus, etc. In a practical sense, no one ever expects to force a reaction to the limits compatible with the conditions because the final stages proceed too slowly and because it is more economical to subject the combinable ingredients to the reacting influence only so long as the reaction takes place with facility.

With such ingredients as we are now dealing, these speeds are intolerably slow; being virtually imperceptible.

When, however, there is present an agent known to possess the peculiar effect usually designated as "catalysis", the natural tendency of the substance to reach the equilibrium figure is vastly promoted or expedited. The catalyst remains unchanged by the operation and its function is that of an accelerator of the natural reaction. For instance, the various phenomena set forth in the foregoing are likewise manifested, but in an accentuated measure, when a catalyst is present, by reason of the fact that the time element is shortened; it being noted that the equilibrium figure or limit is not disturbed by the catalyst but remains rigidly determined as before by the temperature and pressure.

Another fundamental peculiarity that must be considered is that we are, to a certain extent, limited in selecting the temperature at which the conversion is to be performed. We would like to work at low temperatures because then a high percentage of the hydrogen and nitrogen could be combined to form ammonia without necessitating unduly high pressure. It will be appreciated that, when such enormous pressures as those ranging much above 1,000 atmospheres are employed, the structural and purely mechanical difficulties become intolerable, for such metals as are actually available (iron and steel) are soon weakened by the action of hydrogen, especially if the temperature is notably high. Likewise, the higher the pressure the greater will be the cost of the apparatus required and the greater will be the expense of operating that apparatus for the purpose of attaining and handling intense pressures. And yet we must employ somewhat high temperatures because it so happens that no catalyst is known which will function effectively in an industrial sense at a comparatively low temperature. On the other hand, the temperature must not be so high as to affect the composition or physical property of the catalyst, either because of the high heat alone or because of the action of hydrogen at that temperature. Any change in the composition or the physical property of the catalyst will usually entirely destroy its ability to act catalytically.

Other things being equal (such as cost, speed, capacity and durability of the catalyzer) we would naturally prefer to employ the one that will function at the lower temperatures but, while various catalysts have heretofore been developed, it so happens that the specific temperatures (most suitable for now known catalysts) range say from 450 to 600 degrees C. At materially lower temperatures, the rate of formation is too slow commercially, and at higher temperatures, the properties of the catalyst are affected. Within the above limits, and working far from the equilibirum point, the higher the temperature, the higher the rate of formation. The operation of catalysis should be carried out somewhat closely to that range of temperatures although, when lower-temperature catalysts become available, the operation of catalysis may to advantage be conducted in accordance with the dictates of this invention but at the correspondingly lowered temperature and, in such circumstances, the pressure may well be lowered.

Now, when we are dealing with a catalyzing agent for the production of ammonia, we are confronted with certain additional complications attributable to the fact that the act of association is an exothermic reaction. It is desirable to carry out the exothermic reaction at such temperatures and pressures as are (independently of the nature of the catalyzer) well adapted to insure a high rate of formation and a high percentage of combination but, of course, the temperature must never be permitted to rise spontaneously to a point such that it will unduly injure the catalyzing agent.

This condition should, likewise, be maintained as to each particle of the catalytic material irrespective of its location within the catalytic tube, and this has heretofore proven to be a matter of great practical difficulty. One reason for this difficulty is that, since the reaction is of an exothermic nature to a rather pronounced degree under the operation conditions, heat is liberated by the reaction induced by every active particle of the catalyst, acting independently, and in consequence, the catalyst manifests a decided tendency not only to be elevated as a whole in temperature beyond the degree selected as being most efficient or economical or as best adapted for continuous operation, but also to become overheated locally. The result of this elevation of temperature is complex. It takes place first locally as to those particles which are most active. It then hastens the degeneration of those particles, and other particles will likewise operate to evolve heat excessively and are in turn deteriorated, and so on until after a time, the entire catalytic mass must be replaced. Some catalysts are capable of standing more abuse in this respect than others but commercial returns demand that the catalytic agent must maintain its maximum effectivity as long as possible to avoid the necessity of replacement.

It has been explained that, working far away from the equilibrium point, if the reaction be once initiated and if it be unbridled, it will tend to run away, so to speak, and the temperature will unduly rise and the catalyzing agent will be subjected to a deteriorating influence which will sooner or later render its replacement necessary. Therefore, the temperature of the reaction must be kept under control; not only generally but, what is even more necessary, locally. As it is exceedingly difficult to do that especially as to the local action, by artificial expedients or by skillful manual control of the apparatus (especially since the local action is so spontaneous) it is highly desirable that some way be devised whereby the reaction will be self-regulating in general as well as locally automatic in its control, so to speak.

This is one of the primary objectives of the present invention and it is attained by an extremely simple conception which, however, is fundamental. The proposition involves the employment of a percentage of ammonia mixed with the combinable ingredients (hydrogen and nitrogen) in a proportion such as will initially appreciably approach (or even fully attain), not the equilibrium figure corresponding to a normally satisfactory functioning of the particular catalyst employed, but the equilibrium figure corresponding to whatever higher temperature would be injurious to the catalyst. By so doing, the heat to be carried away substantially as fast as generated and any increase in temperature will (by reason of the reduction in the limit of the reaction corresponding to that particular increased temperature) spontaneously and disproportionately slow down the reaction and thus automatically check the evolution of heat and enable the catalyst to return to its normal temperature and forthwith act with its normal degree of effectivity.

A decrease of temperature in this process will carry the mixture so much farther from the new equilibrium figure proportionally that the increased rate of formation due to the new conditions will operate to restore the temperature of the régime.

It is impossible, within a temperature range of 450 to 600° C. to form in the catalyzer all the ammonia required to bring the percentage as near to the equilibrium point as demanded by this process. In attempting such a procedure, the temperature would increase long before the percentage of the ammonia reached the figure demanded by the régime. An increase of temperature before this point is reached, will mean an increase in the rate of production, an increase in the heat generated, and consequently a further increase in temperature; all contrary to the requirements of any process. In this process, not all the ammonia is formed in the catalytic tube, a definite percentage is already present in the gaseous mixture. My invention, therefore, permits of the operation comparatively near to the equilibrium, a condition unattainable by any other process.

The disproportional nature of the inhibiting effect resulting from the initial presence of the ammonia is rendered apparent in a more striking manner if we should employ 9% for the predetermined amount. The catalyst would, when operating at 500 degrees C., be able to accomplish a conversion amounting to 37% less 9%, i. e. 28% for its total work. That is to say, it would have before it a prospective conversion amounting to 28/37 or 75.7% of the work it would be able to perform had no initial ammonia been present. Now, if the temperature should, through some cause, rise to 750 degrees C., (a temperature assumed to be fatal to the catalyst) the initially added ammonia would precisely equal the equilibrium figure for that temperature and the catalyst would be able to do no work whatsoever and there could be no rise in the temperature. The self-control in this example is quick-acting and very sensitive and holds the temperatures within very close limits. It is not, however, desirable from a commercial standpoint to employ any greater amount of initial ammonia than is necessary to keep the temperature from running away to the point of impairing the catalyst. It is desirable to continue the production of ammonia so long as the temperature may be automatically kept within permissible limits. It has been ascertained that, from a commercial standpoint, economically efficient results may be obtained by employing neither too much nor too little ammonia for the reasons above explained and that, at a temperature of about 500 degrees C. and under a pressure of about 650–700 atmospheres, an initial percentage of ammonia in the vicinity of 5% will operate very beneficially.

In adhering to the proposition defined by this invention, under conditions such that the percentage of ammonia in equilibrium will be higher than in the aforesaid example, the amount of pre-added ammonia will be correspondingly increased so as to produce the automatic control characteristic of this invention. Conversely, where the prevailing conditions determine a lower percentage of ammonia in equilibrium, the amount of pre-added ammonia will be diminished to carry out the effect. In other words, while the control becomes more sensitive as a greater quantity of initial ammonia is used, there is no necessity for using any greater quantity of extra ammonia than will ensure a sensitiveness adequate to prevent the catalyst from being subjected to unduly deteriorating temperature increases; thereby enabling a relatively high yield for each passage of the gases through the catalyzer.

This invention assumes its more comprehensive form when embodied in a cyclic procedure. It is manifest, from what has been explained, that the initially added ammonia may be derived from any source and that, after the thus-prepared gases have been subjected to the catalysis, they may then be appropriately treated for the purpose of extracting such amounts of ammonia therefrom as may be desirable under the conditions of operation. Of course, all of the ammonia could be extracted and the hydrogen and nitrogen could then be supplied with the small amount of ammonia requisite to control the catalysis. This invention, however, may be resorted to in a more efficient and satisfactory manner by so conducting the extraction of ammonia that the requisite residue of ammonia will remain admixed with the unconverted hydrogen and nitrogen; the mixture being thus properly conditioned preparatory to a re-treatment either by the catalyzer first employed or by another catalyzer and so on cyclically. It will be seen that the amount of ammonia extracted is equivalent to the amount produced by the catalyzer so that all of the ammonia produced in each cycle is actually recovered; the predetermined residue being, so to speak, merely employed repeatedly for control purposes.

The cyclic embodiment is deemed to be the best manner of carrying out this invention. In that embodiment, the extracted gases are returned to the catalyzing chamber together with such additions of fresh nitrogen and hydrogen as will compensate for the amount of ammonia which has been extracted from the gases leaving the catalyzer. Upon leaving the catalyzer, the gases will be subjected to a treatment such as will remove all of the ammonia with the exception of the residue predetermined as to amount by the rules explained heretofore. This is performed with great ease in this embodiment of this invention inasmuch as it is not necessary to attempt to withdraw the last traces of the ammonia. The gases are under a pressure such that, when cooled moderately, for example to the temperature of running water, all of the ammonia, excepting the predetermined residue, may be condensed to liquid form and may easily be drawn off. When the cycle is being performed in a practical way, the amount of residual ammonia can very easily be regulated by merely regulating the flow of the stream of water effecting the refrigeration. If the pyrometer indicating the temperature within the catalyzing chamber persists in exceeding the desirable point, the amount of water flowing through the condenser may be reduced; thereby increasing the amount of the residual ammonia. The latter will thereupon automatically control the temperature within closer limits. Conversely, if the catalyzer exhibits some sluggishness in its activity, more water may be admitted to the condenser and this will result in a decrease in the predetermined amount of residual ammonia and a more liberal control of the catalyzer will ensue and a more energetic catalytic action will thereupon result.

The amount of actual yield per passage will, of course, depend in part upon the quantity of gases and the time consumed in passing through the catalyzer and in part upon the quantity of initially present ammonia and the flow will be regulated to keep it as high as possible consistent with the use of a sufficient amount of residual ammonia to afford a control of such sensitiveness that the catalyst will be safe-guarded against becoming overheated either generally or locally, as above explained. By causing the gases to circulate so rapidly as to produce a high frequency in the recurrence of the cycle, a high yield per unit of time may be obtained. This desideratum is achieved by this invention inasmuch as it, by appropriately adjusting the sensitiveness of the automatic control, permits a high rate of circulation, in so far as chemical considerations are involved, to be resorted to without incurring a liability that the catalysis shall take place with an intensity injurious to the operation, apparatus or the catalytic agent.

Inasmuch as those catalyzers which are composed of comparatively inexpensive materials, or which are adapted to be prepared for action in an inexpensive manner, generally have a working life of limited duration, this process may be very advantageously resorted to since thereby the catalyzer is enabled to function for substantially the entire period corresponding to its normal life. It has been demonstrated in a commercial sense that a catalyzer which would ordinarily require replacement after a short interval of operation may be kept in continuous use for seven weeks or more without requiring replacement. In starting the cycle which, as stated, will thus be maintained in continuous action for an extensive period, comparatively speaking, it will be found to be convenient to initiate the action by admitting merely nitrogen and hydrogen to the catalyzing chamber and continuing the operating until the catalyst becomes heated to its operating temperature and until substantial quantities of ammonia are being formed. During the first week or so of the cyclic operation, lower pressures may advantageously be employed by reason of the greater initial activity of the catalyst. For example, a pressure of say 500 atmospheres and a temperature of from 500 to 600 degrees C. may be used during the first week or so; the pressure being gradually increased to correspond with the condition of the catalyst until, during the final stages of the cycle, the operation will be performed at say from 650 to 700 atmospheres.

Having thus revealed this invention, I claim as new and desire to secure the following combinations and elements, or equivalents thereof, by Letters Patent of the United States.

1. The cyclic process of synthetically producing ammonia which consists in initiating the process by first subjecting nitrogen and hydrogen gases to the action of a catalyzer and subsequently carrying out the regular cycles by utilizing some of the ammonia thereby formed together with the uncombined amounts of nitrogen and hydrogen in the process of producing additional amounts of ammonia; the last-mentioned regular cycles being carried out at a pressure of several hundred atmospheres and at a high temperature and the proportion of ammonia associated with the nitrogen and hydrogen being in the vicinity of 5% at the beginning of each regular cycle.

2. A self-regulating method of catalysis for the production of ammonia which consists in bringing into the presence of a given catalyzing agent at a temperature compatible therewith only such admixtures of hydrogen and nitrogen as contain about 5% of ammonia gas and in performing said operation under a high pressure.

3. The art of producing ammonia which consists in causing a mixture of hydrogen and nitrogen containing considerable ammonia to be initially subjected to the action of a catalyst at a high pressure and at substantially the temperature of its effectivity, said proportion of ammonia being intentionally employed and approximating an equilibrium figure corresponding to a temperature injurious to the catalyst for the purpose of retarding the speed and reducing the extent to which the reaction can be carried should it endeavor to attain the limit determined by the injurious temperature and the normal pressure.

4. The process of producing ammonia catalytically which consists in employing hydrogen, nitrogen and ammonia in the proportion determined by the equilibrium between ammonia and uncombined hydrogen and nitrogen at a temperature incompatible with the catalyst under the pressure of normal operation; then causing such admixtures to be subjected at a compatible lower temperature and said pressure to the action of the catalyst.

5. The art of chemically combining hydrogen with nitrogen to produce ammonia which comprehends causing the combinable elements under a pressure of several hundred atmospheres, together with a predetermined substantial quantity of ammonia, to flow in contact with a catalytic agent at a temperature not substantially greater than that compatible with the normal effectivity of said catalyst; subsequently removing the treated gases and extracting therefrom only so much ammonia as will leave a residue equaling a predetermined amount, and then again subjecting the uncombined elements admixed with said predetermined residue of ammonia to the action of a catalytic agent at a temperature not substantially greater than is compatible with the normal effectivity of said agent.

6. The art of synthetically producing ammonia by the direct combination of hydrogen and nitrogen through the instrumentality of an appropriate catalyzer which consists in admitting to the presence of said catalyzer only such admixtures of nitrogen and hydrogen as contain a quantity of preformed ammonia sufficient to reduce appreciably the rate of formation in case the temperature should unduly rise and causing said gases at a high temperature and pressure to flow past said catalyzer at a rate adequate to carry away such excess amounts of generated heat as will keep the temperature of reaction within limits precluding any undue deterioration of the catalyzing agent or unduly reducing the percentage of an ammonia capable of being attained within the equilibrium figure determined by the desirable temperature and pressure.

7. A self-regulating method of catalysis for the production of ammonia which consists in continuously bringing into the presence of a catalyzing agent at a temperature compatible therewith only such highly compressed admixtures of hydrogen and nitrogen as contain a percentage of ammonia gas appreciable with respect to the equilibrium figure of an unduly high temperature, then refrigerating out all but a residue of the ammonia from the treated gases, and then again subjecting the gases to a catalytic agent at a temperature suitable thereto.

8. An ammonia producing process in which, at a comparatively high temperature compatible with the catalyzer employed, said catalyzer is subjected to only such highly compressed admixtures of hydrogen and nitrogen as contain a predetermined proportion of ammonia effective to reduce appreciably the extent to which the conversion may proceed, permitting said gases to remain under the influence of said catalyzer until a very substantial amount of ammonia has been formed, then removing as much ammonia as has been formed and again subjecting the gases to a catalyzer.

9. In a process of producing ammonia by causing hydrogen and nitrogen to combine at a high pressure and temperature in the presence of a catalyzing agent, the use of a predetermined amount of pre-formed ammonia, admixed with such hydrogen and nitrogen as is brought into contact with a catalyzer, for the purpose of controlling the rate of formation, then withdrawing said gases and removing ammonia therefrom, then bringing the uncombined nitrogen and hydrogen together with a predetermined quantity of ammonia again under the influence of a catalyzer for the purpose of again forming a substantial amount of ammonia.

10. The art of producing ammonia which consists in causing a mixture of hydrogen and nitrogen containing a proportion of ammonia to be initiably subjected for a short time to the action of a catalyzer at a high pressure and at a temperature at which it may effectively function, said proportion of ammonia being such as will remain uncondensed when the gases at said high pressure are cooled not substantially lower than normal temperature, said proportion being intentionally employed for the purpose of controlling the rate of formation, then cooling the product under high pressure to condense ammonia, and then subjecting the residual ammonia nitrogen and hydrogen to a catalyzer.

11. The process of producing ammonia catalytically which consists in synthetically forming such admixtures of hydrogen, nitrogen and ammonia as approach initially to a material degree the equilibrium of hydrogen, nitrogen and ammonia corresponding to an injuriously high temperature and pressure, then causing such pre-formed admixtures to be subjected at a somewhat lower temperature and at a predetermined pressure to the action of an appropriate catalyzing agent for a sufficient interval of time to enable a material quantity of the hydrogen and nitrogen to combine chemically and subsequently recovering ammonia from the mixed products of reaction.

12. The process of synthetically producing ammonia which consists in subjecting nitrogen and hydrogen gases to the action of a catalyzer and then utilizing ammonia thereby formed together with the uncombined amounts of nitrogen and hydrogen in the process of producing additional amounts of ammonia; the last-mentioned operation being carried out at a pressure of several hundred atmospheres and at a high temperature and the proportion of ammonia associated with the nitrogen and hydrogen being about 5%; then recovering as much ammonia as has been formed from the gases thus treated; and again subjecting the residual uncombined hydrogen and nitrogen in the presence of residual ammonia to the influence of a catalyzer.

13. The cyclic process of synthetically producing ammonia which consists in subjecting nitrogen and hydrogen gases to the action of a catalyzer and repeatedly utilizing a small amount of the ammonia formed in preceding cycles together with the uncombined amounts of nitrogen and hydrogen in the process of producing additional amounts of ammonia; the repeated operations being carried out at a pressure of several hundred atmospheres and at a high temperature and the proportion of ammonia mixed with the nitrogen and hydrogen subjected to the cyclic treatment being not substantially different from 5%.

14. The art of synthetically producing ammonia cyclically by the direct combination of hydrogen and nitrogen through the instrumentality of an appropriate catalyzer which consists in admitting to the presence of said catalyzer during each cycle only such admixtures of nitrogen and hydrogen as contain a quantity of pre-formed ammonia sufficient to control the rate of formation and causing said gases at a high temperature and pressure to flow past said catalyzer at a rate adequate to keep the temperature of reaction within limits precluding any undue deterioration of the catalyzing agent or unduly reducing the percentage of an ammonia capable of being attained within the equilibrium figure determined by the desirable temperature and pressure; and recovering the greater portion of the ammonia after each cycle of the continuous operation.

In witness whereof, I hereunto subscribe my name, as attested by the two subscribing witnesses.

LUIGI CASALE.

Witnesses:
J. F. HANDING,
H. EARLE RUSSELL.